Nov. 6, 1956  J. F. ZISKAL  2,769,502
HYDRAULIC POWER STEERING MECHANISM FOR VEHICLES
Filed Dec. 10, 1953  2 Sheets-Sheet 1

INVENTOR
JOSEPH F. ZISKAL

ATTORNEY

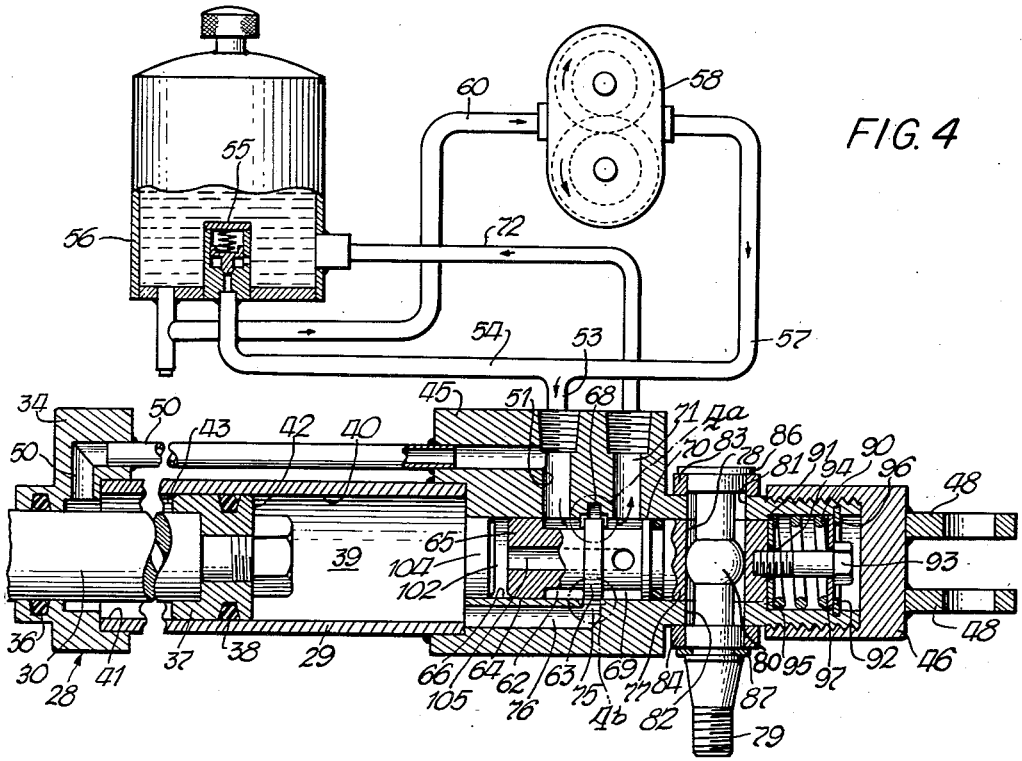

United States Patent Office 2,769,502
Patented Nov. 6, 1956

2,769,502

HYDRAULIC POWER STEERING MECHANISM FOR VEHICLES

Joseph F. Ziskal, Brookfield, Ill., assignor to International Harvester Company, a corporation of New Jersey Application December 10, 1953, Serial No. 397,427

11 Claims. (Cl. 180—79.2)

This invention relates to steering devices for vehicles and more specifically to a novel power steering device incorporating an hydraulic system for effecting steering movement of the vehicle steering wheels in response to movement of the vehicle steering wheel.

A general object of the invention is to devise a simple and efficient power steering device which may be incorporated in vehicles currently in use.

Another object of the invention is to devise such a power steering device of simple and efficient design and which will obtain substantially equal power for steering in either direction.

A further object of the invention is to devise such a power steering device which will operate at substantially the same speed in either direction of turning.

A still further object of the invention is to devise an hydraulic motor with a simple valve system for operation and connection with the steering column by direct and positive linkage whereby even the slightest movement of the steering wheel is correspondingly reflected in the operation of the steering device.

A different object of the invention is to devise a novel valve arrangement providing in its neutral position communication of low pressure fluid to the opposite sides of the hydraulic ram in a balancing action with respect to each other to establish steering stability and prevent side drift.

Another object is to provide a simple valve arrangement in the hydraulic system such as will require minimum accuracy and machining to provide a rugged and long lived system.

These and other objects of the invention will become more apparent from the specification and the drawings, wherein:

Figure 4 is a diagramatic view of the hydraulic system with the hydraulic motor and valving shown in axial cross section taken substantially on line 4—4 of Figure 2 in neutral position.

Figure 4a is a fragmentary enlarged view of the circumscribed portion 4a in Figure 4.

Figure 4b is a fragmentary enlarged view of the portion circumscribed in the circle designated 4b of Figure 4.

Figure 5 is a view similar to Figure 4 on a reduced scale and showing the hydraulic motor and valve set in advance position, and Figure 6 is a view similar to Figure 5 and showing the valve in retract position.

Figure 1:
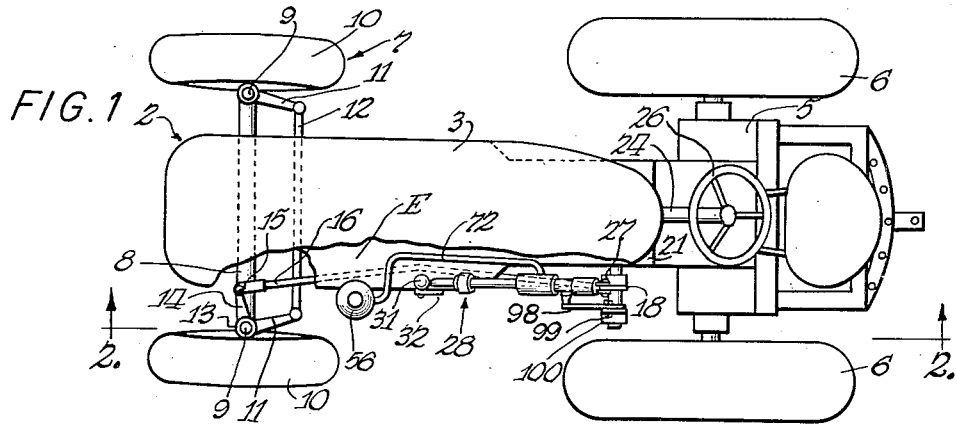
Figure 1 is a plan view of a tractor incorporating the novel device, parts of the tractor being broken away in order to more clearly illustrate the invention.
Figure 2:
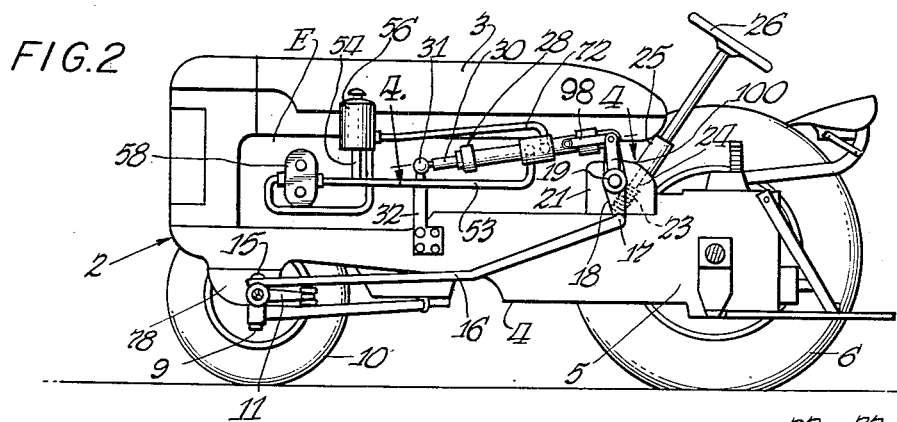
Figure 2 is a longitudinal sectional view of the structure shown in Figure 1 taken substantially on the line 2—2 of Figure 1.
Figure 3:
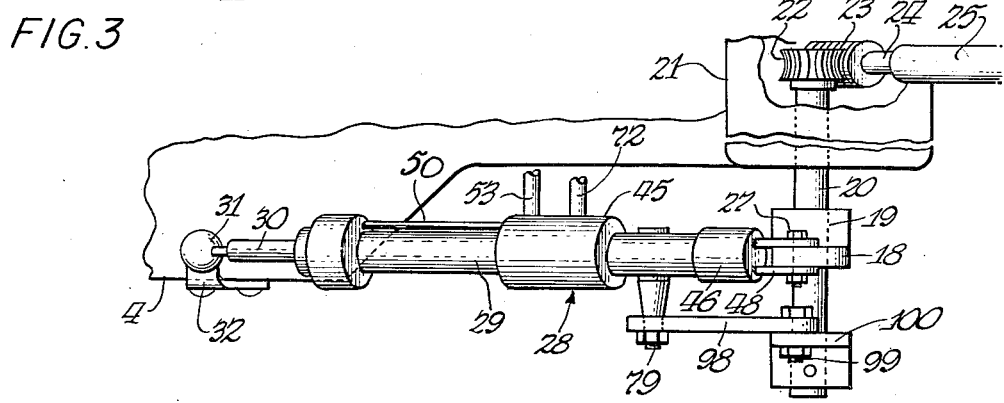
Figure 3 is an enlarged plan view of the hydraulic power device with the tractor fragmentarily shown.

Describing the invention in detail, the device is shown applied to a tractor, generally designated 2, which comprising a longitudinal body 3 incorporating a framework 4, the rear end of which is supported from a transverse housing 5 carried by a pair of traction wheels 6, 6 and the forward end of which is carried by a steering truck 7 including a cross member 8 connected to the frame 4 and wheel spindle supporting assemblies 9, 9 carried at opposite ends of the member 8 and journalling a pair of forward steering wheels 10, 10 which are interconnected for conjunctive movement about the vertical axes of assemblies 9, 9 by means of a steering linkage constituted of rearwardly extending lever arms 11, 11 forming part of assemblies 9, the arms being pivotally interconnected by a tie bar 12. One of the arms 11 may be part of a bellcrank 13 which has its other arm 14 pivoted at 15 to one end of a drag link 16 which extends rearwardly and at its other end is pivoted at 17 to the lower end of an operating lever 18 which, intermediate its ends, is pivoted as at 19 on a stub output shaft 20. The shaft 20 is rotatably supported from a gear casing 21 which is mounted on the framework 4, the casing 21 enclosing the inner end of the shaft 20 upon which is mounted a spur-gear 22 constrained for rotation therewith and meshing with a worm-gear 23 which is provided on the lower end of a steering shaft 24, said shaft 24 forming part of the steering column and extending through a sleeve 25 which may be integral with the box 21. The shaft 24 is provided at its upper end with a steering wheel 26 constrained for rotation therewith.

It will be apparent that rotation of the steering wheel 26 in one direction will rotate the shaft 20 in one direction and rotation of the wheel 26 in the opposite direction, of course, will rotate the shaft 20 in the reverse direction.

The opposite or upper end of the lever 18 is pivoted as at 27 to one end of an hydraulic motor generally designated 28 and more specifically to one end of a cylinder component 29 of the motor unit 28, the opposite end of the unit 29 having a ram operable therein comprising a piston stem 30 extending therefrom and the free end of the stem 30 having a universal ball connection 31 with the frame 4 through the medium of an upstanding arm 32 rigidly secured thereto.

The stem 30 extends into the cylinder 29 through an end cap 34 and is in tight engagement therewith as effected by a sealing ring 36 in the cap embracing the stem.

The inner end of the stem 30 is connected to a piston 37 which includes a peripheral sealing ring 38 in fluid tight engagement with the interior 39 of the cylinder 29 and dividing the same into advance and return chambers 40 and 41.

It will be noted that the piston presents an effective pressure area 42 to the chamber 40 which is substantially twice as large as that of its opposite side 43 which faces into the return chamber area 41.

The end of the cylinder 29 remote from the piston stem 30 is connected to one end of a valve body or housing generally designated 45 of a valve means 45' the valve body 45 being in longitudinal alignment with the cylinder 29 and at its end remote therefrom having an end cap 46 threaded thereon as at 47, the cap having a pair of spaced ears 48, 48 which are apertured to receive the pin 27 therethrough to effect the pivotal connection with the upper end of lever 18.

The return chamber 41 is connected through a conduit 50 to an inlet port 51 of the valve body 45, said inlet port 51 being connected to a flexible high pressure line 53 which has one branch 54 connected through a relief valve 55 to a reservoir 56 which may be carried on the tractor. The other branch 57 of the high pressure line is connected to the discharge side of a constant delivery hydraulic pump 58 which may be driven from the engine E of the tractor, said engine being carried by the frame 4 in the body 3 in the usual manner and may be of any conventional design. The intake or suction side of the pump 58 is connected to a low pressure intake line 60 which is connected to the reservoir 56.

The inlet port 51 of the valve body 45 communicates with an annular valve chamber 62 defined between axially spaced lands 63 and 64 disposed respectively on the inner end and center portion of a valve spool or stem 65 within a longitudinal bore 66 in the valve body 45. It will be appreciated that the chamber 62 is always in communication with the high pressure line 53, 57 through the port 51 in all positions of the valve spool 65.

Referring now to Figure 4 wherein the neutral position of the valve is shown it will be seen that the land 64 is centered with respect to an arcuate circumscribing by-pass chamber 68 formed in the valve body 45 about the bore 66 and in communication therewith. It will be seen from a consideration of Figure 4a that the axial width of the counterbore or chamber 68 is greater than that of the annular land 64 and that in the neutral position the land 64 is centered with respect to the chamber 68 whereby fluid is ported from the chamber 62 through the chamber 68 and into a discharge chamber 69 defined between the land 64 and a land or guide collar 70 formed integral with the spool and spaced axially from the land 64, the chamber 69 communicating at all times in all positions of the valve spool with a discharge or outlet port 71 which communicates with a flexible return or discharge line 72 connected to the reservoir 56.

A utilization port 75 is provided in the valve body 45 in radial alignment with the arcuate chamber 68 diametrically opposite thereto, said port 75 opening into the bore 66 and in the neutral position of the valve stem 65 communicating through an intersecting arcuate chamber 68' in the body 45 with both chambers 62 and 69 through balanced ports 68a and 68b which with chamber 68 are dimensioned to provide substantially one half of the pressure in the line 76 connecting port 75 with chamber 40, and chamber 40 as that developed in line 50 and chamber 41 in order to balance the pressure forces acting on the ram faces 42 and 43 respectively in order to hold the piston against movement. In generic terminology the arrangement 68', 68a and 68b with land 63 in neutral is designated a balanced port chamber. Thus in neutral both chambers 41 and 39 are connected to the discharge port 71.

The land or guide portion 70 is continued into an extension 77 which is provided with a transverse opening 78 through which extends a control arm or element 79, the rod 79 being provided intermediate its ends with a spherical ball contact 80 complementally fitting within the cylindrical opening 78. The opposite ends of the control element 79 extend through enlarged openings 81, 82 in the valve body, said openings intersecting the bore 66. The opposite ends of the control member 79 are movably mounted through the medium of sealing washers 83 and 84 and locking flange means 86 and split snap ring 87 interlocked with rod 79 in order to permit movement of the member 79 with the valve stem longitudinally of the bore 66.

The stem 65 is urged to neutral position by a compression spring 90 which is precompressed between a pair of abutment washers 91 and 92 and connected by a bolt 93 threaded as at 94 into the stem 65. The abutments 91 and 92 are positioned between shoulders 95 and 96 spaced axially of the bore therewithin and seating the washers 91 and 92 thereagainst in the neutral position of the stem 65 with the spring 90 expanded. The shoulder or stop 96 is in the form of a snap ring expanded into a complementary groove 97. The spring is thus preset as to its limit of expansion such that the valve is constantly biased to neutral position.

The control element 79 is connected to one end of a control link 98 which at its other end is pivotally connected as at 99 by means of a bolt and nut assembly to an upstanding radial arm 100 which at its other end is fixedly connected to the steering wheel output shaft 20.

*Mode of operation*

In operation, rotation of the steering wheel 26 will rotate the worm 23 which in turn will rotate the spur-gear 22 which in turn rotates the shaft 20 in either direction depending upon the direction of rotation of the wheel 26. This movement of the shaft 20 is reflected through the linkage 100, 98 to the control member 79 which, assuming that it moves the arm 79 to the right as shown in Figure 5, will in turn move the spool 65 to the right to advance position away from the hydraulic motor against the compressive resistance of the spring 90 whereby the land 64 is moved to enlarge port 68a and reduce port 68b until port 68b is fully closed in the fully open position of the port 75 which receives fluid with increasing pressure until passage 68 is fully closed from the chamber 69 to which fluid is being ported through the inlet port 51 of the valve body whereupon fluid pressure is established in chamber 40. The fluid is thus admitted to the advance chamber 40 under full pressure and inasmuch as the effective area 42 of the piston stem facing into the chamber 40 is of greater magnitude than the area 43, and as herein shown on the order of 2:1 the piston assembly or ram 30, 37 is moved to the left to expand or extended position while the fluid in the chamber 41 is being exhausted through the conduit 50 into the port 51 against the back pressure developed by the pump. It will be appreciated that the larger area 42 of the piston stem overcomes this back pressure and effects movement as rapidly in this direction as in return. As soon as the operator ceases rotating the steering wheel, lever 18 will be rotated until the arm 79 assumes a neutral position and the spring 90, urging the valve stem to neutral position causes the land 64 to assume a neutral position with respect to chambers 68 and 68'. In the neutral position the action is hereinbefore described.

When the operator turns the steering wheel 26 in the opposite direction to that just described this motion is reflected through the linkage 100, 98 to the control element 79 which urges the stem 65 against the compressive resistance of the spring 90 to the left (Figure 6) to retract position of the stem whereby reducing the area of port 68a and increasing the area of port 68b and increasingly opening the port 75 to the exhaust or discharge chamber 69 whereat fluid exhausts to the exhaust port 71 and into the exhaust line 72 into the reservoir. Simultaneously with the closing of port 68a from chamber 62 the by-pass chamber 68 is closed from communication with the chamber 62 and the inlet port 51 as best seen in Figure 6 and the fluid is ported through the conduit 50 into the chamber 41 effecting retraction of the ram 30, 37. It will be noted that in this position there is a back pressure resistance to the stem moving into the cylinder by the throttling effect of the dimensions of the line 76 and ports 75 and 68b connecting the advance chamber 40 to the exhaust line 72. As soon as the operator ceases rotation and the lever 18 aligns transversely with the arm 100, the valve stem 65 is returned to its neutral position whereupon the fluid is ported from the inlet port 51 through the chamber 62 through the chamber 68 and into the exhaust port 71 and through the return line 72 to the reservoir and through ports 68a, 68b, chamber 68', port 75, line 76 and chamber 40.

It will be noted that the guides or collars 63 and 70 may be roughly machined, the guide 70 being provided with a seal. Any slight leakage past the land 63 will collect in the bore portion 102 (Figure 4) which is closed by a plug 104 from chamber 40. The stem 65 is provided with a center duct 105 communicating with the portion 102 of the bore and the exhaust chamber 69.

While there is shown and described herein the preferred structure in which the principles of the present invention have been embodied, it is to be understood that the invention is not to be limited to the specific details shown and described above, but that, in fact, widely different means may be employed in the broader aspects of the invention.

What is claimed is:

1. In a power steering device for a vehicle having a frame and a steering truck therefor including wheel means and steering linkage operatively associated therewith, manual steering apparatus carried upon said frame and including an output shaft rotatable pursuant to manipulation of said steering apparatus, a lever pivoted upon said shaft and having an operative connection to said linkage, an hydraulic motor reactively connected between said frame and said lever, said motor comprising a cylinder, a ram having a rod extending from one end of said cylinder and having a piston slidably mounted within said cylinder and dividing the same into advance and return chambers, valve means carried upon the opposite end of said cylinder and comprising a body with a longitudinal bore therein substantially coaxial with said cylinder, said body pivoted to said lever at an end remote from said cylinder, a valve spool within said bore and having a land in fluid tight engagement with said bore, guide collars at opposite sides of said land on said spool and spaced axially thereof and defining intake and outlet chambers with said land, respectively, a fluid reservoir, a pump having a suction side connected to said reservoir and a discharge side connected to said intake chamber, said outlet chamber connected to said reservoir, a by-pass passage in said valve body communicating with said intake and outlet chambers in the neutral position of said spool whereat said land is axially centered with respect to said passage, conduit means affording communication between said intake and return chambers, conduit means communicating with said advance chamber, a utilization port in said valve body connected to said last mentioned conduit means and communicating with said bore through a port chamber therein centered with respect to said land in said neutral position whereat said port chamber communicates with said intake and outlet chambers, said spool movable longitudinally of said bore in one direction from the neutral to close said by-pass passage and said port chamber to said outlet chamber and to simultaneously open said utilization port to communication with said intake chamber whereat fluid is ported into said advance chamber urging said ram to extended position against the back-pressure in said return chamber, said piston having a larger area facing into said advance chamber and a lesser area facing into said return chamber, said spool movable in the reverse direction to said first mentioned direction whereby opening said port to said outlet chamber and simultaneously closing said by-pass passage from said intake chamber whereby fluid is ported into said return chamber for retracting the ram while exhausting said advance chamber, and operating means for said spool connected between the same and said shaft and including shifting linkage for moving the spool in accordance with the movement of said shaft.

2. In a system for selectively operating an hydraulic motor having a cylinder closed at one end and a ram reciprocal in the other end and having a rod with a piston slidable within the cylinder and dividing it into advance and return chambers, said piston having a larger pressure area facing into said advance chamber and a lesser pressure area into said return chamber, a valve having a body with a bore, an inlet port, an outlet port and an intervening utilization port spaced longitudinally of said bore in intersecting relation thereto, a stem movable lengthwise of the bore and having end and intermediate lands substantially in fluid tight engagement with the bore and dividing it into intake and discharge chambers, said lands spaced to develop a relationship in all operative positions of the stem whereat said intake chamber is always in communication with said inlet port and said discharge chamber is always in communication with said outlet port, said stem having a central neutral position whereat said intermediate land is disposed in throttling relationship to said utilization port, a conduit connection between said inlet port and said return chamber, a conduit connection between said utilization port and said advance chamber, a by-pass passage in said body positioned to interconnect in the neutral position of said stem said intake chamber and said discharge chamber with said intermediate land centered between the ends of said passage, said stem having a fore position at one side of neutral whereat said intermediate land is disposed to close one end of said by-pass passage from said intake chamber and opens said utilization port to said discharge chamber whereat fluid is ported under pressure to said return chamber and exhausted from said advance chamber, said stem having an aft position at the opposite side of neutral whereat said intermediate land is disposed in closing position of said utilization port and the other end of said by-pass passage to said discharge chamber and said utilization port is open to said intake chamber whereby fluid is ported to said advance chamber and exhausted from said return chamber into the intake chamber by the fluid acting against the larger area of said piston in said advance chamber.

3. The combination according to claim 2 and a balanced port chamber in said body and open to said bore and communicating with said utilization port and positioned in the neutral position of said stem to effect communication between said intake and discharge chambers and said utilization port and formed and arranged to effect a pressure adjustment of the fluid acting on said larger piston area to equal that acting on said smaller piston area.

4. In a control for a hydraulic motor comprising a cylinder, a ram operable therein and including a piston dividing said cylinder into advance and return chambers; a valve described in its neutral position having a housing with a bore, a valve stem mounted in said bore for axial movement therein and having a pair of axially spaced end lands and an intermediate land dividing said bore into intake and exhaust chambers, inlet and outlet ports in the housing communicating with said intake and exhaust chambers respectively, a utilization port in the housing including a balanced port chamber intermediate said inlet and outlet ports and intersecting said bore, a by-pass passage open to the bore and having opposite ends open to said intake and exhaust chambers, said stem in neutral position disposed with said intermediate land in partial closing across said balanced port chamber and between said opposite ends of said by-pass passage whereat accommodating fluid flows from said intake chamber to said exhaust chamber and from said intake chamber through said utilization port to said advance chamber, conduit means effecting fluid communication between said return and said intake chambers, a source of high pressure fluid communicating with said inlet port, said stem shiftable axially to an advance position whereat said intermediate land is disposed in closing relation to said by-pass and opening said utilization port to admit fluid to said advance chamber, said piston presenting a larger area into said advance chamber than to said return chamber of the order to overcome the back pressure of the fluid in said return chamber.

5. The combination according to claim 4 and spring means reactively mounted between said stem and said housing for constantly biasing said stem to neutral position.

6. The combination according to claim 4 and said stem having a retract position whereat said intermediate land closes said utilization port and said by-pass from said intake chamber and opens said utilization port to said exhaust chamber so that fluid is ported from said intake chamber to said return chamber and said advance chamber is exhausted.

7. The combination according to claim 6 and said stem movable longitudinally of said bore and said neutral position being disposed between said advance and retract positions, and spring means reactively mounted between said stem and said housing for constantly urging said stem to neutral from either said advance or retract positions.

8. The combination according to claim 7 and said valve housing mounted upon said cylinder and said ram connected to a stationary member and said cylinder connected to a movable operating member, and said bore elongated longitudinally of said cylinder, means for operating said valve, and said housing oriented to move relative to said stem with said cylinder to neutral position of said stem from either of the two other positions thereof.

9. In a power steering device, an hydraulic motor comprising a cylinder with a ram therein having a piston dividing said cylinder into advance and return chambers a valve carried by said cylinder having a body with a longitudinal bore extending lengthwise of said cylinder, inlet and outlet ports in said body spaced longitudinally of said bore and intersecting the same, a utilization port in said body intersecting said bore intermediate said ports, a valve stem described in its neutral position having axially spaced lands disposed outwardly of said ports and having an intermediate land disposed between said inlet an outlet ports across said utilization port in closing relation thereto, said lands defining intake and exhaust chambers in radial alignment with said inlet and outlet ports, respectively, balanced ports communicating with said utilization port and said intake and exhaust chambers respectively, a by-pass passage in said bore in radial alignment with said utilization port and having opposite ends communicating with said intake and exhaust chambers, respectively, conduit means connecting said intake chamber and said utilization port to said return and advance chambers respectively, a source of high pressure fluid connected to said inlet port, said stem movable away from said motor to advance position and toward said motor to retract position, means for operating said valve stem in selected direction, said stem in advance position having said intermediate land moved to close said by-pass passage from said exhaust chamber and open said utilization port to said intake chamber, said piston presenting a substantially larger working area into said advance than into said return chamber whereby fluid upon being ported into said advance chamber effects outward movement of said ram against the back pressure of fluid exhausting from said return to said intake chamber whereupon moving said cylinder and valve body toward said stem to said neutral position thereof, said stem in said retract position movable toward said cylinder and displacing said intermediate land to close said by-pass passage to said intake chamber and open said utilization port to said exhaust chamber whereby fluid is ported to said return chamber retracting said ram into said cylinder and moving the latter and said valve body away from said stem whereupon returning said stem to neutral position with respect to said body.

10. The combination of a reservoir containing fluid and a pump having a suction side connected to said reservoir and an exhaust side, a cylinder and a ram operative therein and including a piston dividing said cylinder into advance and return chambers, a valve comprising a body having a longitudinal bore, inlet, exhaust, and utilization ports in said body intersecting said bore, conduit means connecting said exhaust side of said pump to said inlet port and return chamber, conduit means connecting said utilization port to said advance chamber, a valve stem having a pair of axially spaced lands and an intermediate land in fluid tight engagement within said bore and dividing it into intake and exhaust chambers connected respectively to said inlet and exhaust ports, said stem described in its neutral position having said intermediate land disposed between said intake and exhaust chambers across said utilization port, and a balanced port chamber in said body open to said bore and communicating intermediate its ends with said utilization port and communicating at one end with said intake chamber and at its other end with said exhaust chamber.

11. The combination of a cylinder and a ram reciprocal therein and having a piston dividing said cylinder into advance and return chambers, said piston presenting a larger pressure area into said advance chamber and a lesser pressure area into said return chamber, a valve having a body with a bore and intersecting axially spaced inlet, utilization, and exhaust ports, said inlet and utilization ports connected respectively to said return and advance chambers, a valve stem axially movable in said bore and having a land in fluid tight engagement with said bore and dividing it into axially spaced intake and exhaust chambers communicating respectively with said inlet and exhaust ports, said stem having a neutral position with said land disposed intermediate said inlet and exhaust ports across said utilization port, a balanced port chamber in said body communicatively disposed between said bore and utilization port and having axially spaced balancing ports open in the neutral position of said stem to said intake and exhaust ports, respectively, said piston having a larger area facing into said advance chamber and a lesser area into said return chamber, and said balancing ports dimensioned to reduce fluid pressure in said advance chamber in the neutral position of said stem in inverse ratio to said areas of said piston.

References Cited in the file of this patent

UNITED STATES PATENTS

| | | |
|---|---|---|
| 1,991,597 | Davidson | Feb. 19, 1935 |
| 2,230,361 | Morin et al. | Feb. 4, 1941 |
| 2,313,704 | Hey | Mar. 9, 1943 |
| 2,341,502 | Ingres | Feb. 8, 1944 |
| 2,462,994 | Price | Mar. 1, 1949 |
| 2,487,618 | Twyman | Nov. 8, 1949 |
| 2,557,936 | Brown | June 26, 1951 |